United States Patent [19]
Alff

[11] Patent Number: 5,622,437
[45] Date of Patent: Apr. 22, 1997

[54] DEVICE FOR FIXING A SENSOR TO A ROLLING-ELEMENT BEARING

[75] Inventor: Denis Alff, Le Pont de Claix, France

[73] Assignee: The Torrington Company, Torrington, Conn.

[21] Appl. No.: 608,832

[22] Filed: Feb. 29, 1996

[30] Foreign Application Priority Data

Oct. 20, 1995 [FR] France .................................. 95 12339

[51] Int. Cl.$^6$ ..................................... F16C 19/08
[52] U.S. Cl. ........................................ 384/448
[58] Field of Search ..................... 384/448, 446, 384/544, 543; 324/173, 174

[56] References Cited

U.S. PATENT DOCUMENTS 5,143,458  9/1992  Alff et al. .
5,431,413  7/1995  Hajzler .
5,438,260  8/1995  Rigaux et al. .
5,451,869  9/1995  Alff .
5,544,962  8/1996  Hofmann et al. ...................... 384/448

FOREIGN PATENT DOCUMENTS 2667947  4/1992  France .

*Primary Examiner*—Lenard A. Footland
*Attorney, Agent, or Firm*—John C. Bigler

[57] ABSTRACT

The bearing has a movable ring and a fixed ring, separated from the movable ring by rolling elements, and is axially restrained by an axial stop member. A support member adapted for mounting of the sensor is positioned between the fixed ring and the axial stop member. Elastic means on the support member biases the support member away from the axial stop member to maintain a constant gap between the coding element and the sensor.

14 Claims, 4 Drawing Sheets

DEVICE FOR FIXING A SENSOR TO A ROLLING-ELEMENT BEARING

BACKGROUND OF THE INVENTION

This invention relates generally to bearings with encoders and, more particularly, to a device for fixing a data sensor opposite a rolling-element bearing equipped with a coding element that can be read by the sensor.

Publication FR-2,667,947 describes a rotational speed sensing device that is pinched between a shoulder and a fixed ring of a bearing, and mounted by a hoop in its housing. In such a mounting, axial displacement or creep of the bearing may occur as a result of mechanical stresses or of differential expansion. Although the operation of the bearing may be unaffected, because an axial stop using "circlips" is often provided, the operation of the sensor may be affected since the relative position of the sensor with respect to the coding element is modified. In addition, the sensor is no longer firmly maintained, and instead has some play, making it sensitive to vibrations. This can result in oxidation of the contacts and micro short circuits, reducing reliability of the signal. And, in the case of a rotating internal ring, centrifugation of pollutants may occur, causing friction, heat, and wear. Finally, such a mounting requires modification of the housing and does not allow independent replacement of sensor and bearing elements.

U.S. Pat. Nos. 5,143,458 and 5,451,869 describe supports for sensors that are elastically fixed to a fixed ring of a bearing, thus eliminating some of the disadvantages described above. However, the engagement between the resilient support member and the fixed ring of the bearing with such configurations requires specific arrangements on the fixed ring. These arrangements can lead to the reconsideration of the mounting conditions of the bearing because of a reduction in the size of the rolling-elements or in the space dedicated to the integrated seal of the bearing. In addition, the resulting diversity of bearings can generate large cost increases, either with regard to the bearing components themselves, or with regard to the inventory requirements at the user's site.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a device for fixing a sensor for detecting a coding element linked to a movable ring of a bearing. The movable ring is separated from a fixed ring of the bearing by rolling elements, and axial movement of the fixed ring is limited by axial stop means. A support member adapted for mounting of the sensor is positioned between the fixed ring and the axial stop means. Elastic means on the support member biases the support member away from the axial stop means to maintain a constant gap between the coding element and the sensor.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
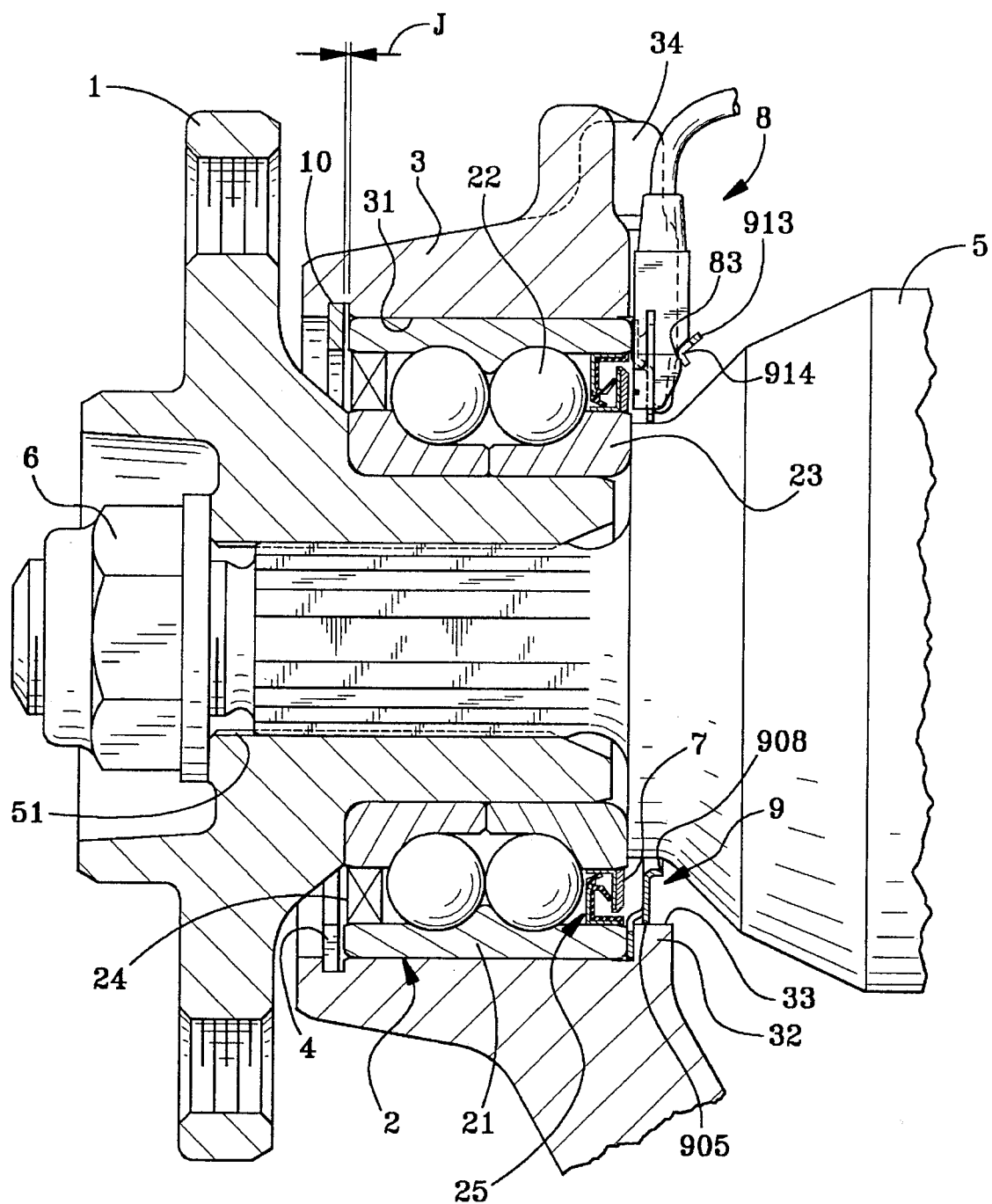
FIG. 1 is a cross sectional view illustrating the device of the present invention as mounted on a drive wheel of a car.
Figure 2:
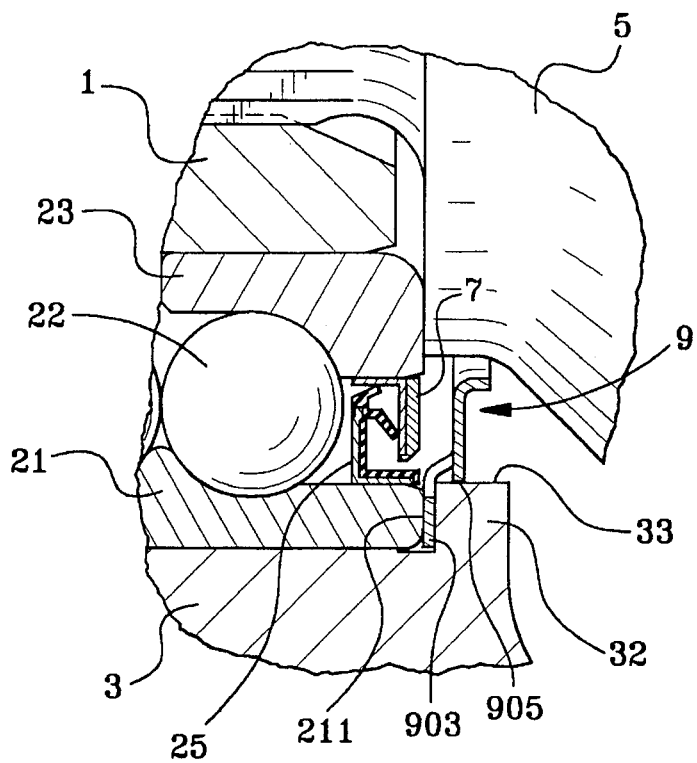
FIG. 2 is an enlarged view of a portion of FIG. 1.

Referring now to the drawings, FIG. 1 illustrates the mounting of wheel hub 1 in rolling-element bearing 2 by a hoop inside borehole 31 of suspension pivot 3, between shoulder 32 delimiting borehole 31 on the transmission side and stop segment 4 located at the end of suspension pivot 3 adjacent the wheel. Wheel hub 1 is attached to transmission shaft 5 by means of splines 51 and axle nut 6.

Rolling-element bearing 2, with standard dimensions, comprises fixed ring 21, separated by rolling elements 22 from movable rings 23. Bearing 2 is sealed by means of first sealing packing 24 and second sealing packing 25. Second sealing packing 25, arranged adjacent shoulder 32, is equipped with coding element 7 linked to movable ring 23 so as to be detected in a contact-free manner by sensor 8, separated from coding element 7 by a predetermined gap. Such a sealing device with an integrated coding device is described, for example, in U.S. Pat. No. 5,431,413.

Figure 3:
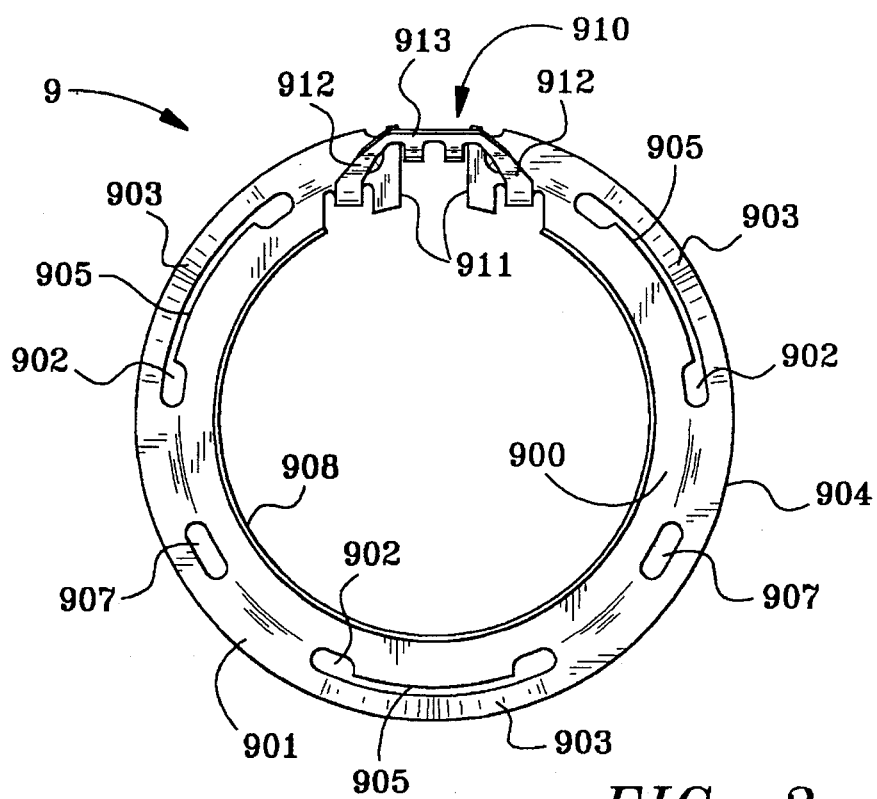
FIG. 3 is a plan view of the support member of the present invention illustrated in FIG. 1.
Figure 4:
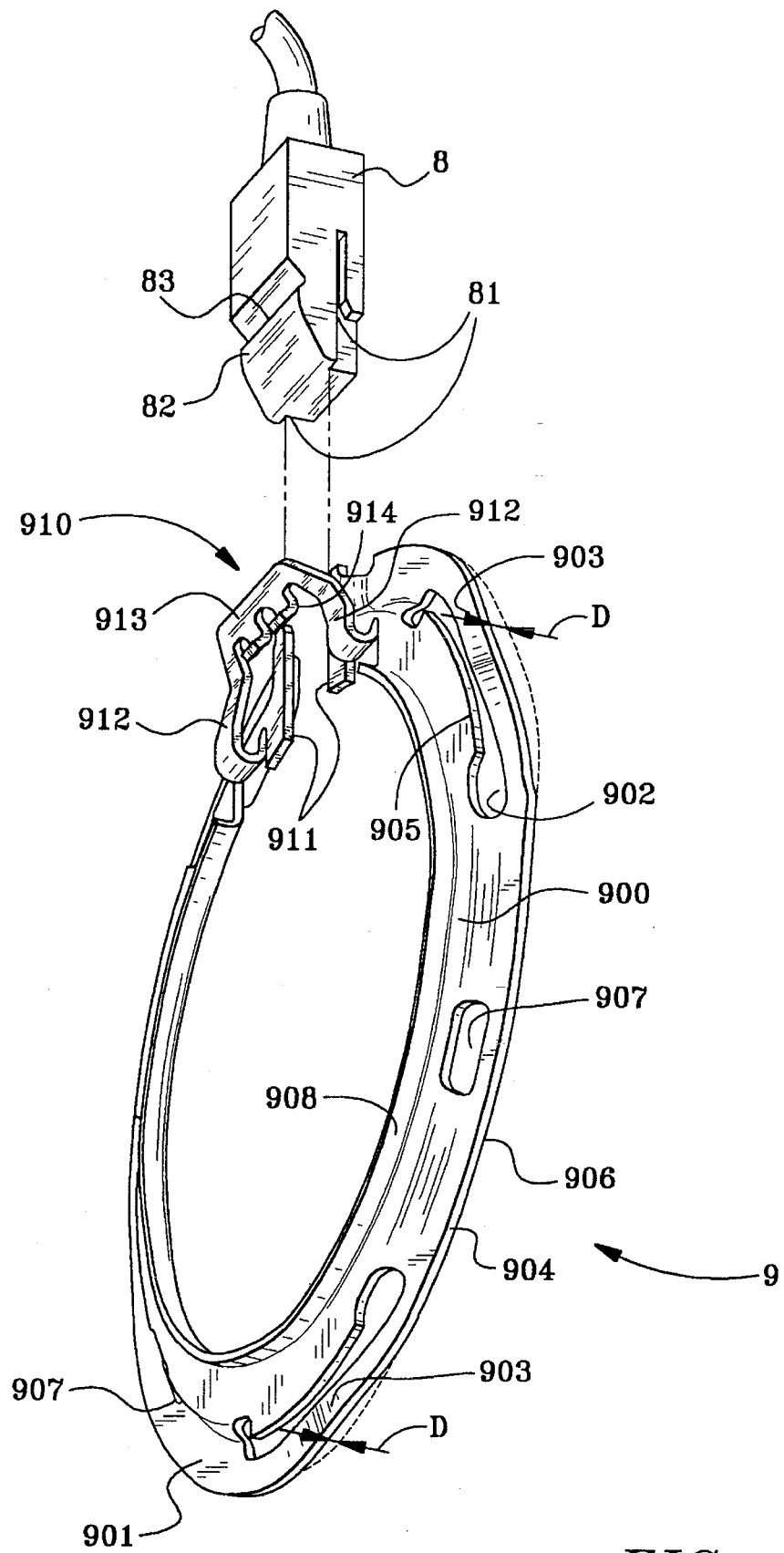
FIG. 4 is a pictorial view of the support member of the present invention illustrated in FIG. 1, with its sensor.

Sensor 8 is fixed to support member 9 which is pinched between fixed ring 21 of bearing 2 and shoulder 32 of suspension pivot 3. Support member 9, illustrated in FIGS. 3 and 4, consists primarily of central annular part 900 that extends in a rigid manner and peripheral annular part 901, concentric with central annular part 900, and is arranged in a plane different from that of central annular part 900. Annular parts 900, 901 are equipped with a radial opening at the level at which head 910 for fixing sensor 8 is located.

Head 910 comprises two slides 911 that are parallel and laterally delimit said radial opening of annular parts 900, 901. On the outside of each slide 911, an arm 912 originates which first extends parallel to slide 911 toward the center of annular parts 900, 901, and then curves 180° back toward the outside of annular parts 900, 901. Arms 912 join to form post 913 so as to form a fixing clamp for receiving sensor 8. Sensor 8 is guided into post 913 by lateral grooves 81, into which slides 911 engage. Sensor 8 has front 82 followed by groove 83. During its progression into arms 912, front 82 spreads post 913 until post 913 engages groove 83 by tabs 914, thus ensuring the clipping of sensor 8 in fixing head 910 of support member 9.

In addition, slots or holes 902 are formed in the junction between central annular part 900 and peripheral annular part 901 of support member 9. Along holes 902 extend arcuate branches 903 that are attached to peripheral annular part 901 at their ends. Arcuate branches 903 are deformed in the axial direction so as to constitute undulations directed toward the plane of central annular part 900 and which extend to the periphery of peripheral annular part 901. Assembly is carried out by simply introducing, into suspension pivot 3, support member 9 oriented with central annular part 900 in the direction of shoulder 32. Centering is achieved by positioning outside diameter 904 of peripheral annular part 901 in borehole 1 or by positioning internal edges 905 of holes 902 in inner diameter 33 of shoulder 32. Internal edges 905 are located in the plane of central annular part 900.

Bearing 2 is then forcibly slid into borehole 31 until it abuts and clamps support member 9 by the portion of peripheral annular part 901 located outside holes 902. Support member 9 is made of a material which has a sufficiently high elastic limit such that the flattening of arcuate branches 903 creates an elastic return force which permanently pushes peripheral annular part 901 of support member 9 back against fixed ring 21. Suspension pivot 3 has local opening 34 that allows the introduction of sensor 8 and its positioning in fixing head 910 of support member 9. Stop segment 4 is then placed in groove 10 of suspension pivot 3, leaving the necessary amount of axial clearance or play, indicated as "J".

During operation, movements of fixed ring 21 in borehole 31 may occur which displace the play J on one or the other side of ring 21. The elastic return provided by the initial deformation of arcuate branches 903 ensures permanent contact, against lateral side 211 of fixed ring 21, of flat side 906 of peripheral annular part 901 located opposite central annular part 900, thus guaranteeing the axial position of support member 9 and consequently a constant gap between sensor 8 and coding element 7. The deformation of arcuate branches 903 is constructed so as to be greater than the play J to compensate for and permanently guarantee a sufficient preliminary load to limit, by friction, both radial and circumferential microshifts of support member 9, making it insensitive to the high vibrations of the environment.

According to a particularly advantageous variant of the invention, support member 9 is constructed in a simple and inexpensive manner by cutting-stamping sheet metal of the desired thickness and possibly undergoing a heat treatment for imparting the necessary mechanical properties and/or a coating against corrosion if necessary. Arcuate branches 903 are obtained by cutting, in peripheral annular part 901, holes 902, followed by independently punching the rest of support member 9. The length of holes 902 is a function of the desired elastic effect which depends on the initial thickness of the sheet metal, the mechanical strength of the constituent material, and the amount of deformation. It is clear that a support member whose elastic elements would be somewhat different from arcuate branches 903 would be within the scope of the invention. The branches could, for example, be attached to peripheral annular part 901 by only one of their ends, they could be rectilinear, etc.

Head 910 for fixing sensor 8 is also made of the same part by a cutting creating the two slides 911 and forming a profile in the shape of a clamp consisting of arms 912 and post 913, followed by folding of said arm 912. In addition, it is easy to provide, at no additional cost, additional openings 907 at the junction between peripheral annular part 901 and central annular part 900 to facilitate the evacuation by gravity or centrifugation of any pollution that could have penetrated the gap between sensor 8 and coding element 7. Finally, support member 9 can be made rigid by providing, in the borehole of central annular part 900, a collar 908 ensuring the dimensional stability of the assembly.

Central annular part 900 of support member 9 also constitutes an additional protection against direct pollution by avoiding the presence of aggressive particles in the gap region and in the sealing packing 25.

Figure 5:
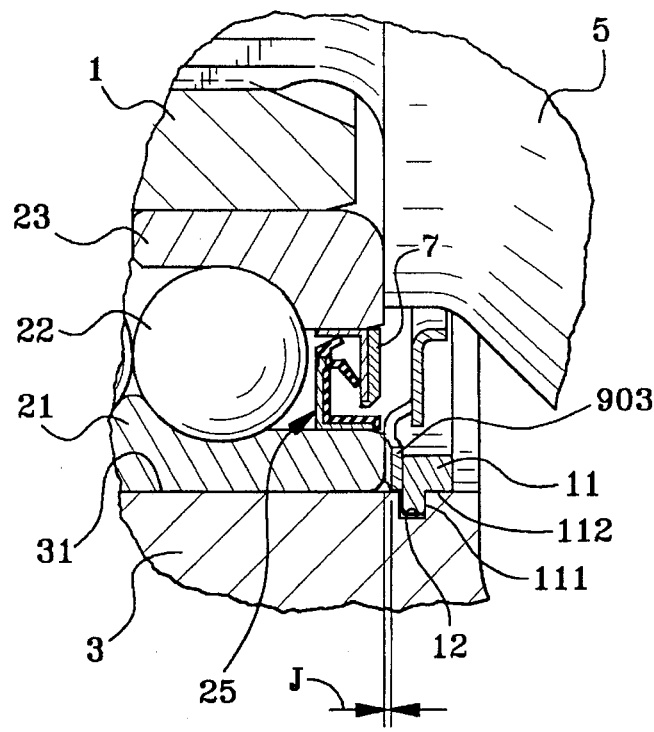
FIG. 5 is a partial cross sectional view similar to FIG. 2 but illustrating a second embodiment of the device of the present invention.
Figure 6:
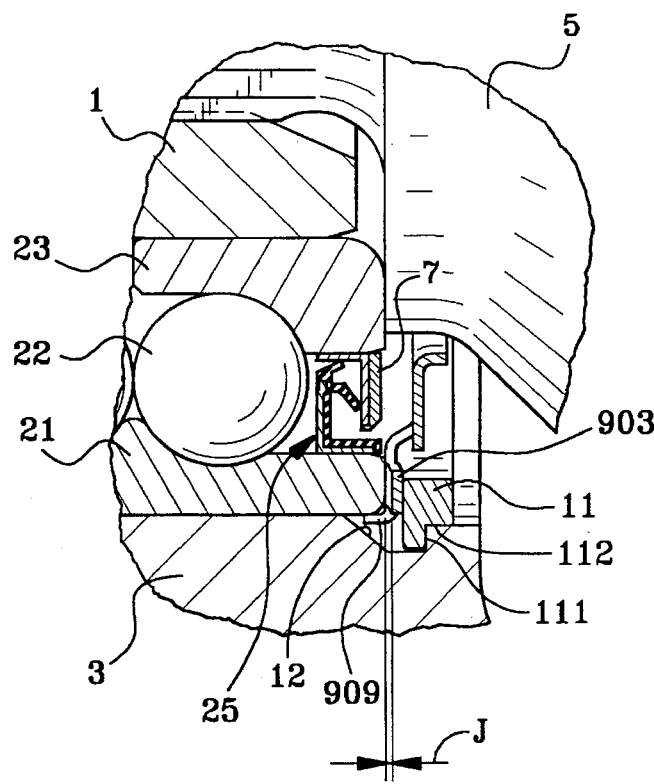
FIG. 6 is a partial cross sectional view similar to FIG. 2 but illustrating a third embodiment of the device of the present invention.

It is possible to consider other embodiments of the present invention in which the direction of the mounting of bearing 2 is reversed. In this case, shoulder 32 of FIG. 1 can be used instead of stop segment 4. The direction of mounting must then be reversed and, as shown in FIGS. 5 and 6, the safety stop would be constructed by means of stop segment 11, this time placed on the side of sensor 8. The assembly of such embodiments is done by first mounting bearing 2 in suspension pivot 3, followed by the insertion of support member 9 before the placement of stop segment 11. The necessary play J is thus located, from the beginning, on the side of support member 9 and it will be compensated for as above, regardless of the position of the bearing during operation.

Because the absence of a shoulder no longer allows radial centering of support member 9 by means of internal edges 905, this centering will be made by positioning outer diameter 904 of peripheral annular part 901 in borehole 31, as shown in FIG. 5, or by means of axial extensions 909 provided on outer diameter 904 being centered on the outer diameter of fixed ring 21, as shown in FIG. 6. In both cases, to prevent support member 9 and central annular part 900 impeding the placement of stop segment 11, the latter can be made of a thinner section and with a reduced height. In order to maintain mechanical function under very strong axial mechanical stresses, stop segment 11 then comprises an "L" profile section whose internal sides 111 and 112 contact corresponding sides of groove 12. In this manner, bending of this segment around the axis of inertia of its section will be avoided, preventing accidental ejection of stop segment 11.

The device of the present invention allows precise control, without adjustment, and regardless of the conditions of operation, of the admissible gap between the coding element and the sensor by elastic adjustment of the play resulting from operation and creep. This device additionally presents the advantage of allowing the separate mounting of the constituent elements, that is, the bearing equipped with the coding element, the support member for the sensor, and the sensor itself, without requiring any major modifications of the concerned and surrounding devices or of the traditional assembly ranges, notably in the mounting of drive wheels for cars.

Naturally, the present invention is not limited to the described and illustrated embodiments which have only been given as examples. For example, the sensor support member can be used with any type of bearing regardless of the rolling elements used.

Having described the invention, what is claimed is:

1. A device for fixing a sensor for detecting a coding element linked to a movable ring of a bearing, the movable ring being separated from a fixed ring of the bearing by rolling elements, axial movement of the fixed ring being limited by axial stop means, the device comprising:

a support member adapted for mounting of the sensor, the support member being positioned between the fixed ring and the axial stop means;

elastic means on the support member for biasing the support member away from the axial stop means to maintain a constant gap between the coding element and the sensor.

2. The device for fixing a sensor according to claim 1, wherein the support member consists of a central annular part extending in a rigid manner, in the direction of the fixed ring, and a peripheral annular part which is concentric and placed in a plane different from that of the central annular part, the peripheral annular part bearing an elastic means that extends toward the plane of the central annular part.

3. The device for fixing a sensor according to claim 2, wherein the elastic means consists of arcuate branches which extend, at the periphery of the peripheral annular part, along holes formed in the junction between the central annular part and the peripheral annular part, the arcuate branches being connected to the peripheral annular part by at least one of their ends and deformed in the axial direction so as to form undulations which extend at the periphery of the peripheral annular part in the direction of the plane of the central annular part.

4. The device for fixing a sensor according to claim 3, wherein each arcuate branch consists of two independent segments each connected by one of its ends to the peripheral annular part.

5. The device for fixing a sensor according to claim 4, wherein the holes of the support member have internal edges and wherein the axial stop means comprises a shoulder in an interior borehole of which the support member is centered by means of said internal edges.

6. The device for fixing a sensor according to claim 2, wherein the support member has, at the junction between the central annular part and the peripheral annular part, additional openings that facilitate the evacuation by gravity or centrifugation of pollution which may have penetrated into a gap between the sensor and the coding element.

7. The device for fixing a sensor according to claim 2, wherein the central annular part of the support member extends axially as a stiffening collar.

8. The device for fixing a sensor according to claim 2, wherein the support member has a retaining means for ensuring fixation without play of the sensor on the support member.

9. The device for fixing a sensor according to claim 8, wherein the retaining means consists of a mounting head comprising two slides that are parallel and laterally delimit a radial opening of the annular part, an arm that originates at the outside of each of the slides and extends parallel to the slides, in the direction of the central annular part, and which then curves 180° back toward the outside of the peripheral annular part, the two arms joining to form a post so as to constitute a fixing clamp for receiving the sensor.

10. The device for fixing a sensor according to claim 1, wherein the axial stop means consists of a stop segment.

11. The device for fixing a sensor according to claim 10, wherein the peripheral annular part of the support member has a periphery that extends toward the bearing, between the arcuate branches, by axial extensions ensuring the centering of the support member on the outer diameter of the fixed ring of the bearing.

12. The device for fixing a sensor according to claim 10, wherein the peripheral annular part of the support member has an outer diameter that is positioned in the borehole.

13. The device for fixing a sensor according to claim 1, wherein the support member is obtained by successive cutting and stamping operations of a single piece made of a thin metal sheet.

14. The device for fixing a sensor according to claim 1 wherein the device is applied to the mounting of a car wheel to allow reading of data originating from the rotating assembly.

* * * * *